J. J. MORAND.
CUSHION WHEEL CONSTRUCTION.
APPLICATION FILED NOV. 18, 1920.

1,438,658.

Patented Dec. 12, 1922.

Inventor:
Joseph J. Morand,
By Dyrenforth, Lee, Chritton & Wiles,
Attys.

Patented Dec. 12, 1922.

1,438,658

UNITED STATES PATENT OFFICE.

JOSEPH J. MORAND, OF CHICAGO, ILLINOIS, ASSIGNOR TO MORAND CUSHION WHEEL CO., OF CHICAGO, ILLINOIS, A CORPORATION OF ILLINOIS.

CUSHION-WHEEL CONSTRUCTION.

Application filed November 18, 1920. Serial No. 424,963.

*To all whom it may concern:*

Be it known that I, JOSEPH J. MORAND, a citizen of the United States, residing at Chicago, in the county of Cook and State of Illinois, have invented a new and useful Improvement in Cushion-Wheel Constructions, of which the following is a specification.

This invention relates particularly to cushion wheels adapted for use in connection with motor vehicles; and the primary object is to provide a simple and durable construction which can be produced at moderate cost.

The invention is illustrated, in its preferred embodiment, in the accompanying drawings, in which—

Figure 1:
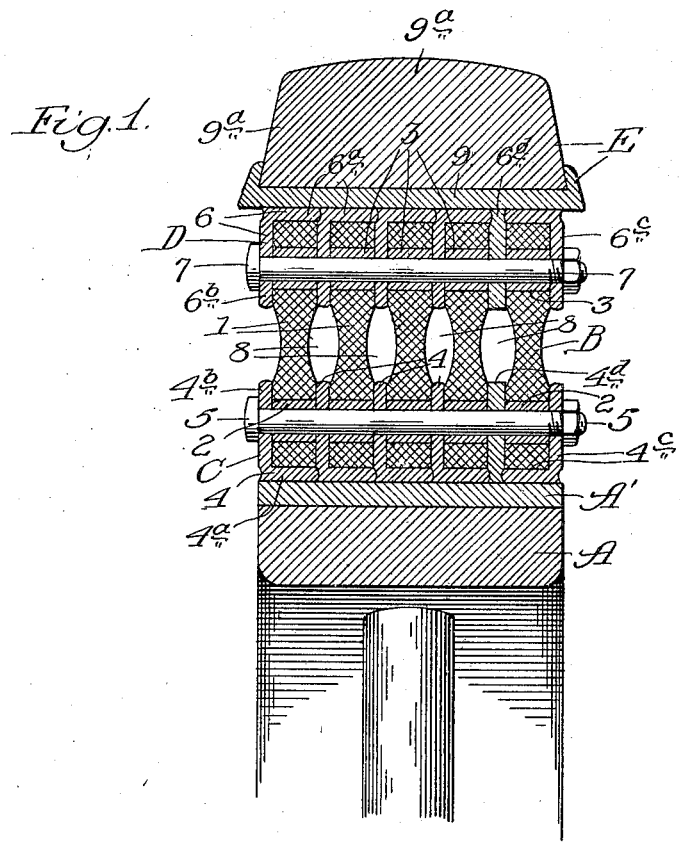
Figure 2:
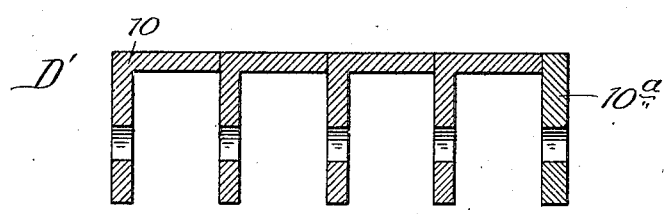

Fig. 1 represents a broken sectional view of a cushion wheel constructed in accordance with the invention and Fig. 2, a sectional view showing a slight modification.

In the construction illustrated in Fig. 1, A represents the felly of a wheel which is preferably fitted with a steel band A'; B represents a rubber cushion element comprising a number of annular rubber units; C represents a sectionally-constructed inner cushion-rim; D represents a sectionally-constructed outer cushion-rim; and E represents a tire applied to the outer cushion-rim.

The wheel center may be of any suitable construction, the wooden felly A and steel band A' thereon being selected as one desirable form.

The rubber cushion element B preferably comprises a series of annular members 1 of comparatively soft, yielding but strong rubber. Each of these annular rubber members is provided at its inner circumferential portion with a series of short sleeves or bushings 2, and at its outer circumferential portion with a series of short bushings 3. These bushings may be molded in position in the operation of molding the rubber, previous to the vulcanizing operation.

The inner cushion-rim C is composed mainly of a series of rings 4 of angle-form cross-section, each having a horizontal flange $4^a$ and a vertical flange $4^b$. These rings are forced onto the band A' under a pressure of many tons, with the horizontal flanges or base portions abutting against each other. In this manner, spaces are afforded between the vertical flanges $4^b$ for the inner circumferential portions of the annual rubber members 1, and the bushings 2 act as spacing members. The angle-form rings have their horizontal flanges turned in the same direction, commencing at one side of the wheel. At the opposite side, the angle member designated $4^c$ is reversed, and a plane ring $4^d$ is interposed between the horizontal portions of the two adjacent angle-form rings. The inner circumferential portions of the rubber members are secured to the vertical flanges of the rings by means of a series of bolts 5 (one shown), which pass through the flanges and through the bushings 2.

In a similar manner, the outer cushion-rim D comprises a series of angle-form rings 6 which have the horizontal portions $6^a$ and the vertical flanges $6^b$. One of the angle-form rings, indicated by $6^c$, is reversed and a plane ring, indicated $6^d$, is interposed between the horizontal flanges of the flanking angle-form rings. The annual rubber members 1 have their outer circumferential portions secured to the vertical flanges of the outer cushion-rims by means of an annular series of bolts 7 (one shown), which pass through the vertical flanges and the interposed bushings 3.

In the construction illustrated in Fig. 1, the horizontal flanges of the rings have their free edges curved or made convex and fitting within concavities at the base edges of the horizontal flanges. The interposed plane rings $4^d$ and $6^d$ are provided with concavities to receive the convex edges of the adjacent horizontal flanges. It is preferred to cut away the intermediate portions of the rubber members 1 as shown, or, in other words, to provide said members with concave lateral surfaces at their intermediate portions, thus providing annular air spaces 8 between the rubber cushion element members.

It will be noted that the annular rubber cushion members are firmly attached at their inner circumferential portions to the inner cushion-rim and at their outer circumferential portions to the outer cushion-rim. The assembly of the cushion-rims and interposed rubber cushion members may be effected before applying the tire and before applying the cushion device to the wheel, if desired.

The tire E is shown as comprising a steel band 9 and a rubber tread $9^a$. The cushion device is forced into the tire under a pressure of many tons as well as being forced onto the wheel under a pressure of many tons. Thus, it will be seen that the cushion members are firmly united at their inner circumferential portions to the wheel and at their outer circumferential portions to the tire. Moreover, the wheel is strongly reinforced by the vertical flanges of the inner cushion rim, and the tire is strongly reinforced by the vertical flanges of the outer cushion-rim. The elements of the sectionally-constructed cushion-rims are of similar form, and may be manufactured readily and cheaply. When the wheel strikes an obstruction, or drops into a rut, the tendency to deformation of the wheel is resisted by the extension of the cushion members at some portions of the wheel and compression thereof at other portions of the wheel. Thus, the shocks are dissipated throughout the entire circumference of the wheel, and the elasticity of distension, as well as the elasticity of compression of the rubber are utilized in dissipating the shocks. Obviously, any number of units may be employed, depending upon the width of the wheel. The vertical flanges serve effectually to reinforce both the tire and the felly of the wheel.

In the modification shown in Fig. 2, a cushion-rim is illustrated, comprising a series of annular angle-form members 10 having their flanges turned in the same direction, the rim being completed by a plane ring 10ª which abuts against the free edge of the last angle.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is—

1. A cushion wheel comprising a felly, a tire, an interposed cushion device comprising a series of annular rubber cushion members, an inner cushion-rim comprising a series of annular angles mounted on the felly and having their circumferential flanges extending in a common direction, an outer cushion-rim comprising a series of annular angles mounted in the tire and having their circumferential flanges extending in the same direction, the vertical flanges of the angles being interposed between the rubber cushion members, and bolts securing the rubber cushion members to the vertical flanges of the angles.

2. A cushion wheel comprising a felly, a tire, an interposed cushion device comprising a series of annular rubber cushion members provided with inner and outer series of bushings, an inner cushion-rim comprising a series of annular angles rigidly mounted on the felly and having vertical flanges interposed between the inner portions of the rubber cushion members, an outer cushion-rim comprising a series of annular angles rigidly mounted in the tire and having vertical flanges interposed between the outer portions of the rubber cushion members, and series of bolts extending through said vertical flanges and interposed bushings.

3. A cushion wheel comprising a felly, a tire, an interposed cushion device comprising a series of annular rubber cushion members having intermediate portions of reduced cross-section and provided with inner and outer annular series of bushings, an inner cushion-rim comprising a series of annular angles rigidly secured on the felly and having vertical flanges interposed between the inner portions of the rubber cushion members, an outer cushion-rim comprising a series of annular angles rigidly mounted in the tire and having vertical flanges interposed between the outer portions of the rubber cushion members, and series of bolts passing through said vertical flanges and interposed bushings.

4. A cushion wheel comprising a felly, a tire, a series of annular rubber cushion members, an inner cushion-rim mounted on the felly and comprising a series of annular angles having horizontal flanges provided with complemental recesses and projections which fit together and having vertical flanges interposed between the inner portions of the rubber cushion members, an outer cushion-rim mounted in the tire and comprising a series of angular angles having horizontal flanges provided with complemental recesses and projections which fit together and having vertical flanges interposed between the outer portions of the rubber cushion members, and series of bolts extending through said vertical flanges and the interposed portions of the rubber cushion members.

5. A cushion wheel comprising a felly, a tire, an interposed cushion device comprising a series of annular rubber cushion members, an inner cushion-rim comprising a series of similarly disposed annular angles, a reversed angle and an interposed plane ring, an outer cushion-rim comprising a series of similarly disposed annular angles, a reversed angle and an interposed plane ring, and series of bolts connecting the vertical flanges and plane rings of said cushion-rims with said rubber cushion members.

JOSEPH J. MORAND.